(12) United States Patent
Karabulut

(10) Patent No.: US 8,312,526 B2
(45) Date of Patent: Nov. 13, 2012

(54) METHOD AND SYSTEM FOR DELEGATING AUTHORITY WITH RESTRICTED ACCESS RIGHT IN AN ONLINE COLLABORATIVE ENVIRONMENT

(75) Inventor: Yuecel Karabulut, Dortmund (DE)

(73) Assignee: SAP Aktiengesellschaft, Walldorf (DE)

( * ) Notice: Subject to any disclaimer, the term of this patent is extended or adjusted under 35 U.S.C. 154(b) by 1167 days.

(21) Appl. No.: 11/000,816

(22) Filed: Nov. 30, 2004

(65) Prior Publication Data

US 2006/0117382 A1    Jun. 1, 2006

(51) Int. Cl.
H04L 29/06    (2006.01)

(52) U.S. Cl. ............. 726/10; 726/5; 713/156; 713/157; 713/158

(58) Field of Classification Search ............. 726/10
See application file for complete search history.

(56) References Cited

U.S. PATENT DOCUMENTS

| | | | | |
|---|---|---|---|---|
| 5,933,503 A * | 8/1999 | Schell et al. ............... | 713/189 |
| 6,105,131 A * | 8/2000 | Carroll ...................... | 713/155 |
| 6,138,235 A * | 10/2000 | Lipkin et al. .............. | 713/155 |
| 6,233,577 B1 * | 5/2001 | Ramasubramani et al. ... | 707/9 |
| 6,324,645 B1 * | 11/2001 | Andrews et al. ........... | 713/157 |
| 6,643,774 B1 * | 11/2003 | McGarvey .................. | 713/155 |
| 6,745,327 B1 * | 6/2004 | Messing ..................... | 713/170 |
| 6,751,735 B1 * | 6/2004 | Schell et al. ............... | 713/189 |
| 6,754,829 B1 * | 6/2004 | Butt et al. .................. | 726/8 |
| 6,807,577 B1 * | 10/2004 | Gillespie et al. ........... | 709/227 |
| 7,058,798 B1 * | 6/2006 | Elley et al. ................. | 713/156 |
| 7,085,834 B2 * | 8/2006 | Delany et al. .............. | 709/225 |
| 7,114,070 B1 * | 9/2006 | Willming et al. .......... | 713/156 |
| 7,213,262 B1 * | 5/2007 | Elley et al. ................. | 726/10 |
| 7,237,107 B2 * | 6/2007 | Wray .......................... | 713/157 |
| 7,313,692 B2 * | 12/2007 | Weeks et al. .............. | 713/156 |

(Continued)

FOREIGN PATENT DOCUMENTS

GB    2357228    6/2001

OTHER PUBLICATIONS

Tardo, Joseph.; Alagappan, Kannan. SPX: Global Authentication Using Public Key Certificates. IEEE Computer Society Symposium on Research in Security and Privacy. Pub. Date: 1991. Relevant pp. 232-244. Found on the World Wide Web at: http://ieeexplore.ieee.org/stamp/stamp.jsp?tp=&arnumber=130791.*

(Continued)

*Primary Examiner* — Nathan Flynn
*Assistant Examiner* — Jeremiah Avery
(74) *Attorney, Agent, or Firm* — Blakely Sokoloff Taylor & Zafman, LLP

(57) ABSTRACT

A method and system to delegate an authority to access collaborative resources are provided. The system enables a participant to re-delegate the authority to another participant by an authorization certificate. A chain of the authorization certificate is established along with the re-delegation of the authority from one participant to another. The participant requesting access to the collaborative resources is requested to provide the owner with the chain of authorization certificate for verification. Therefore, the re-delegation process may be performed without the need to notify the owner and yet without comprising the security of the collaborative resources. In addition, the system provides for restricting the participant from accessing the collaborative resources. Consequently, though the participant may not have access to the collaborative resources, he is still able to re-delegate the authority to another participant.

44 Claims, 7 Drawing Sheets

| ISSUER 71 | HOLDER 72 | RE-DELEGATION FLAG 73 | SELF USAGE FLAG 79 | OPERATION 74 | VALIDITY 75 | |
|---|---|---|---|---|---|---|
| CLIENT 60 | CLIENT 62 | TRUE | TRUE | READ (36, 38, 40,42) | 2002 - 2006 | 70 / 76 |
| CLIENT 62 | CLIENT 64 | TRUE | FALSE | READ (36, 38, 40) | 2003 - 2006 | 77 |
| CLIENT 60 | CLIENT 64 | TRUE | TRUE | READ (36, 38, 40) | 2003 - 2006 | 140 |
| CLIENT 64 | CLIENT 66 | FALSE | TRUE | READ (36, 38) | 2004 - 2005 | 78 |
| CLIENT 60 | CLIENT 66 | FALSE | TRUE | READ (36, 38) | 2004 - 2005 | 142 |

U.S. PATENT DOCUMENTS

| | | | | |
|---|---|---|---|---|
| 7,318,155 | B2 * | 1/2008 | Yellepeddy | 713/158 |
| 7,353,396 | B2 * | 4/2008 | Micali et al. | 713/176 |
| 7,356,690 | B2 * | 4/2008 | Benantar | 713/155 |
| 7,415,607 | B2 * | 8/2008 | Sinn | 713/158 |
| 7,444,509 | B2 * | 10/2008 | Nadalin et al. | 713/156 |
| 7,571,314 | B2 * | 8/2009 | Lortz | 713/157 |
| 7,770,212 | B2 * | 8/2010 | Le Saint | 726/5 |
| 2002/0144108 | A1 * | 10/2002 | Benantar | 713/156 |
| 2002/0156737 | A1 * | 10/2002 | Kahn et al. | 705/51 |
| 2003/0115342 | A1 | 6/2003 | Lortz | |
| 2003/0163686 | A1 * | 8/2003 | Ward et al. | 713/156 |

OTHER PUBLICATIONS

Freudenthal et al, "dRBAC: Distributed Role-based Access Control for dynamic Coalition Environments", 2002 IEEE, Proceedings of the 22nd Int'l Conference, pp. 372-381,XP010595553.

Castelluccia et al, "Securing Group Management in IPv6 with Cryptographically Generated Addresses", Internet Engineering Task Force, Feb. 2001, pp. 24-28, XP015003726.

Paajarvi, J., "XML Encoding of SPKI Certificates", Internet Engineering Task Force, Mar. 2000, p. 14, 17, 27-28, XP015033614.

* cited by examiner

| ISSUER 71 | HOLDER 72 | RE-DELEGATION FLAG 73 | SELF USAGE FLAG 79 | OPERATION 74 | VALID PERIOD 75 | |
|---|---|---|---|---|---|---|
| | | | | | | ⎯ 70 |
| CLIENT 60 | CLIENT 62 | TRUE | TRUE | READ (36, 38, 40, 42) | V1 | ⎯ 76 |
| CLIENT 62 | CLIENT 64 | TRUE | FALSE | READ (36, 38, 40) | V2 | ⎯ 77 |
| CLIENT 64 | CLIENT 66 | FALSE | TRUE | READ (36, 38) | V3 | ⎯ 78 |

FIGURE 3

| ISSUER 71 | HOLDER 72 | RE-DELEGATION FLAG 73 | SELF USAGE FLAG 79 | OPERATION 74 | VALIDITY 75 | |
|---|---|---|---|---|---|---|
| CLIENT 60 | CLIENT 62 | TRUE | TRUE | READ (36, 38, 40, 42) | 2002 - 2006 | 76 |
| CLIENT 62 | CLIENT 64 | TRUE | FALSE | READ (36, 38, 40) | 2003 - 2006 | 77 |
| CLIENT 60 | CLIENT 64 | TRUE | TRUE | READ (36, 38, 40) | 2003 - 2006 | 140 |
| CLIENT 64 | CLIENT 66 | FALSE | TRUE | READ (36, 38) | 2004 - 2005 | 78 |
| CLIENT 60 | CLIENT 66 | FALSE | TRUE | READ (36, 38) | 2004 - 2005 | 142 |

(Table labeled 70)

METHOD AND SYSTEM FOR DELEGATING AUTHORITY WITH RESTRICTED ACCESS RIGHT IN AN ONLINE COLLABORATIVE ENVIRONMENT

FIELD OF THE INVENTION

An embodiment relates generally to the field of online collaboration. More particularly, an embodiment relates to a method and a system for establishing authority to access resources in electronic environments, e.g., online meetingplaces, virtual organizations and electronic communities.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects that they could not undertake individually, or to offer composed services that could not be provided by individual organizations.

A growing array of technologies has emerged to help bridge the gaps between people, time and geography in such collaborative environments. These include both synchronous and asynchronous technologies such as email, web conferencing and instant messaging. These technologies often include the ability to display and share application files. Presentations, spreadsheets and documents are shared among participants without requiring the participants to have these files individually installed on their system.

However, such online collaboration is threatened by security issues such as data eavesdropping, data tampering and entity repudiation. Often, customer information and financial account numbers are stolen through data eavesdropping, whereby data remains intact but privacy is compromised. In a data-tampering event, the data is altered or replaced in a transaction. For example, someone can change the amount to be transferred to and from a bank account. In entity repudiation, the identity of the participant is compromised. Often, data is passed to a person who poses as the intended recipient.

Many security and trust management technologies have been developed to address the demand for secured online collaboration. One common security approach includes using the Public Key Infrastructure (PKI), which is the standard for public-key cryptographic security and is used to ensure the security of digital certificates. PKI infrastructure provides these security measures—user authentication, data integrity and confidentiality. With the PKI infrastructure, a pair of keys is used to provide strong authentication and encryption services. The key pair is associated with a user by the use of a certificate containing the user's public key and attributes associated with the user. Often, the certificate is digitally signed by a trusted third party, such as the Certification Authority (CA), and is valid only for a certain period of time. The public key associated with and certified by the certificate works with the corresponding private key possessed by the entity identified by the certificate. The PKI infrastructure is able to verify the identities of the participants through the certificate and maintain data integrity with the encryption technology.

SUMMARY OF THE INVENTION

According to one aspect of the present invention, there is provided a method to delegate an authority to a recipient for accessing protected resources. The method includes building an authorization certificate with restricted access right; establishing a chain of authorization certificates with each redelegation; and verifying an access request for the protected resources.

According to a further aspect of the present invention, there is provided a method to verify the chain of authorization certificates includes comparing a first and a second certificate, the first and the second certificate being a first and a second authorization certificate of the chain of authorization certificates respectively. The comparing the first and the second certificate further includes determining a sequence of issuer-holder; determining a re-delegation authority of the second certificate is not permitted when the re-delegation authority of the first certificate is not permitted; determining a type of operation performed of the second certificate is a set or a subset of the first certificate; and determining a valid period of the second certificate is a set or a subset of the first certificate.

According to a further aspect of the present invention, the authorization certificate includes a self-usage authority which restricts the recipient from accessing the protected resources.

Other features of the present invention will be apparent from the accompanying drawings and from the detailed description that follows.

DESCRIPTION OF THE DRAWINGS

An embodiment of the present invention is illustrated by way of example and not limitation in the figures of the accompanying drawings, in which like references indicate similar elements and in which:

FIG. 3 is a block diagram of an exemplary embodiment of a authorization certificate of a participant;

FIG. 6 is a block diagram of an exemplary embodiment of a verification certificate derived from a chain of authorization certificates.

DETAILED DESCRIPTION

A method and system for delegating authority in a collaborative environment are described. In the following description, for purposes of explanation, numerous specific details are set forth in order to provide a thorough understanding of an embodiment of the present invention. It will be evident, however, to one skilled in the art that the present invention may be practiced without these specific details.

Platform Architecture

Figure 1:
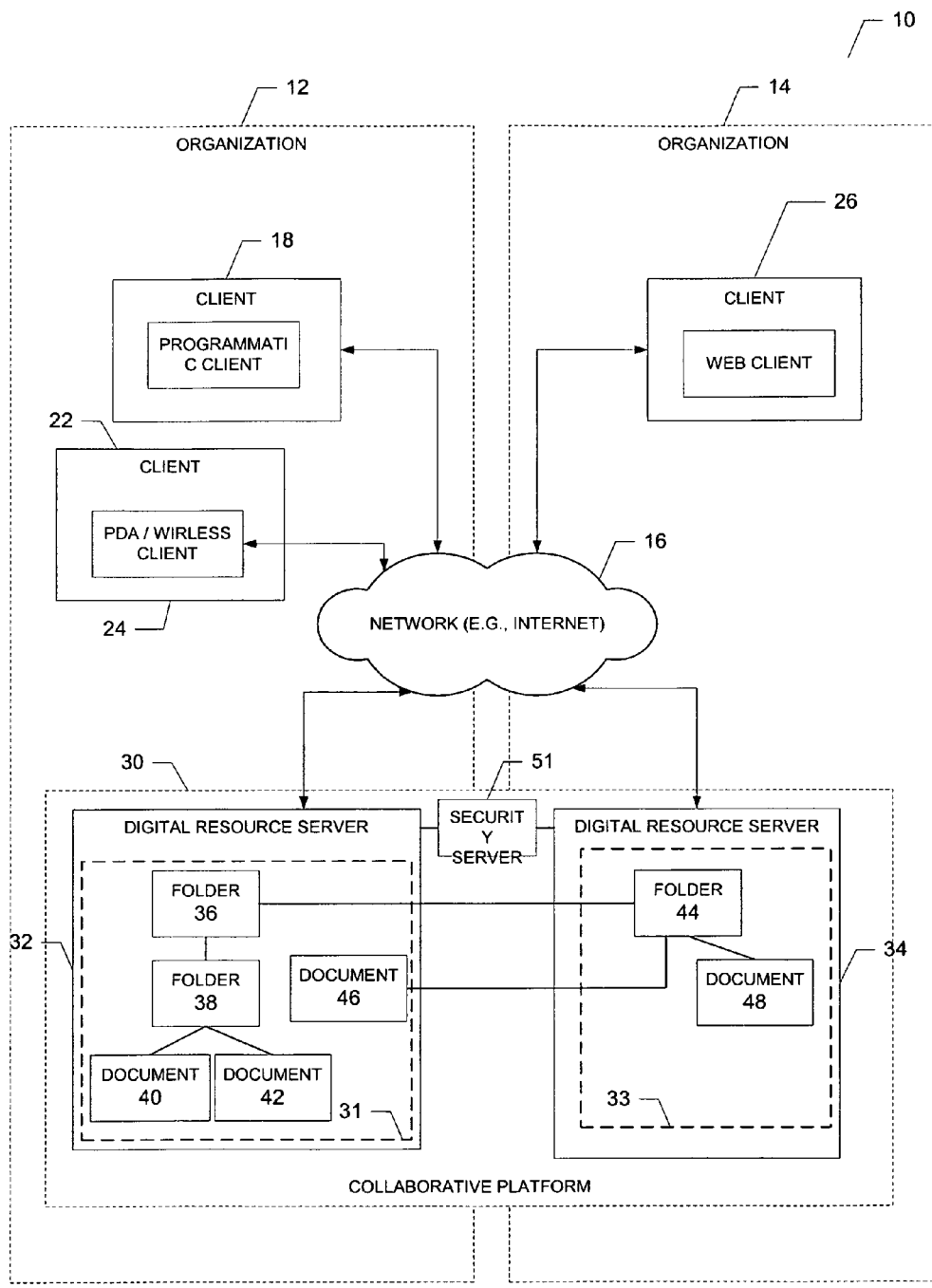
FIG. 1 is a network diagram depicting a system for delegating authority to a participant for accessing collaborative resources in accordance with one exemplary embodiment of the present invention.

FIG. 1 is a network diagram depicting a system 10, according to one exemplary embodiment of the present invention, having a client-server architecture. A collaborative platform 30 provides collaborative resources 31, 33 via a network 16 (e.g., the Internet) to one or more clients in a first organization 12 and a second organization 14.

In one embodiment, the collaborative platform 30 contains digital resource servers 32 and 34 belonging to the first organization 12 and the second organization 14 respectively. The digital resource servers 32 and 34 contain collaborative 31, 33 which are shared between the first organization 12 and the second organization 14. The digital resource server 32 of the first organization 12 contains a folder 36, a sub-folder 38 and documents 40, 42 and 46. The documents 40 and 42 are further classified in to sub-folder 38. The digital resource server 34 hosts a folder 44 which contains a document 48.

Virtually, the folder 36 is configured as the parent of folder 44 though folders 36 and 44 are located at different location, such as in digital resource servers 32 and 34 respectively. Similarly, the folder 44 of the second organization 14 is the virtual parent of document 46 of the first organization 12. Therefore, when a client has access to folder 44, the client is able to view documents 46 and 48 in the folder 44.

In one embodiment, the digital resource servers 32 and 34 are coupled to a security server 51. The security server 51 provides the function of verifying a client who requests access to the collaborative resources. In one embodiment, the security server 51 authenticates the identity of the client and verifies the client's right to perform certain operations on the collaborative resources.

FIG. 1 further illustrates that the clients 18, 22 and 26 of organizations 12 and 14 contact the collaborative platform 30 via the network 16 (e.g., Internet). According to one exemplary embodiment of the present invention, the clients 18, 22 and 26 use an authorization certificate provided by security servers 50 and 52 respectively. The authorization certificate expresses a permission to access the collaborative resources.

In this exemplary embodiment, the collaborative resources 31 and 33 shown in FIG. 1 are centrally located in the digital resource server 32 and 34. The present invention is not limited to such architecture and the collaborative resources 31 and 33 could be located in a distributed architecture system (e.g., at the client).

In addition, while FIG. 1 shows the collaborative platform 30 being managed jointly by the first organization 12 and the second organization 14, the collaborative platform 30 may be provided by a third party entity such as an online collaborative provider.

Collaborative Platform

Figure 2:
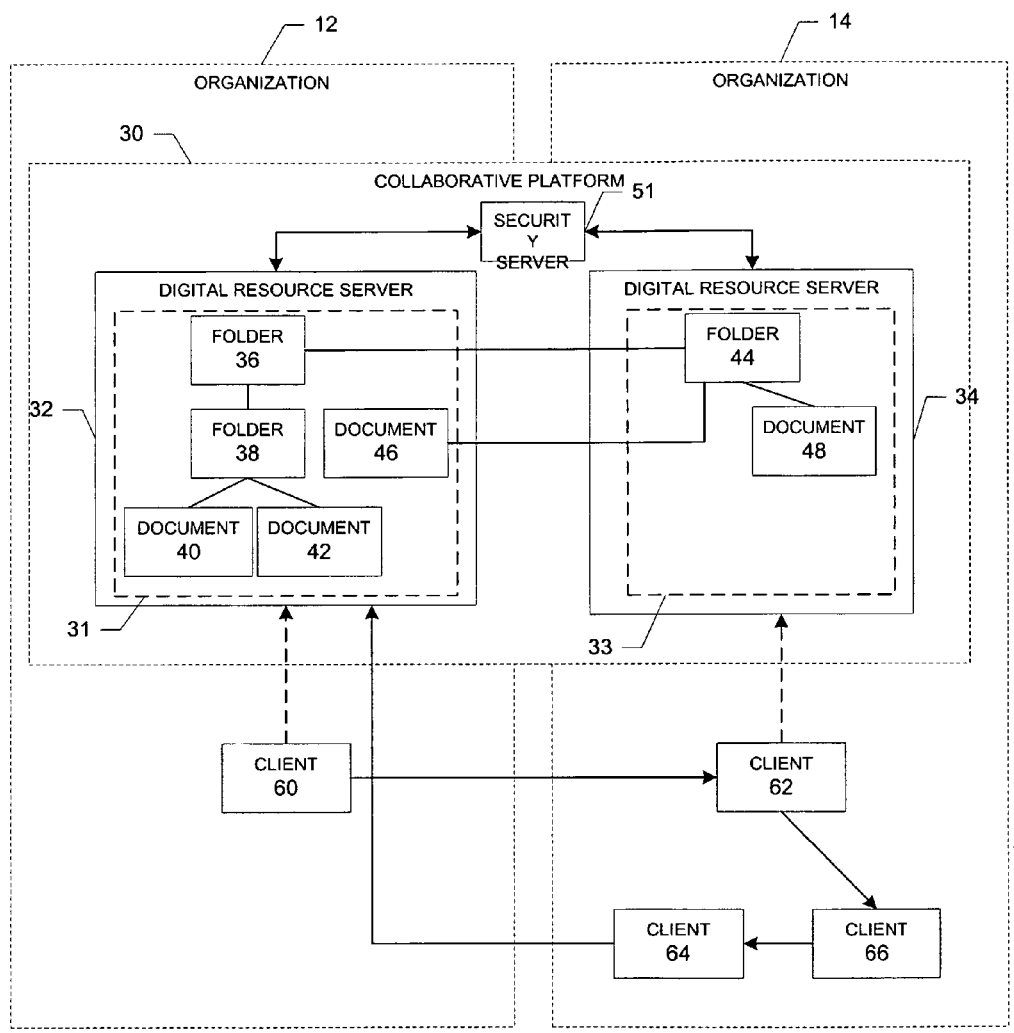
FIG. 2 is a network diagram depicting a collaborative platform for a participant to access collaborative resources in accordance with another exemplary embodiment of the present invention.

FIG. 2 is a network diagram depicting a collaborative platform 30 for a client to access collaborative resources 31, 33 in accordance with another exemplary embodiment of the present invention.

In one embodiment, a client 60 of the first organization 12 is the owner of the digital resource server 32. The client 60 has the authority to permit another client, such as clients 62, 64, 66 of the second organization 14, to access the folders 36, 38 and documents 40, 42, 46. Similarly, the client 62 of the second organization 14 is the administrator of the digital resource server 34.

According to one exemplary embodiment of the present invention, the client 60 provides the client 62 with the permission to re-delegate the authority to access the collaborative resources 31 to another entity, e.g., clients 62, 66, 64. The advantage of the present embodiment is that the client 60, owner of the collaborative resources 31, need not know to whom the client 62 has re-delegated the authority. The client 60 only authenticates the chain of re-delegation when receiving a request to access the collaborative resources 31.

As illustrated in FIG. 2, the client 62, in turn, re-delegates to client 66 the authority to access the collaborative resources 31. In addition, the client 62 permits client 66 to also re-delegate the access authority to another client such as client 64.

When the client 64 submits a request to access the digital resource 32, the client 60 requires client 64 to prove that the re-delegation authority originates from client 60 and has propagated through a chain of authorized entities. In addition, the client 60 verifies the type of operation that client 64 is allowed to perform. For example, if the client 64 requests to perform a write operation, client 60 verifies that client 64 has inherited from client 66 who has in turn received the write permission from client 62.

Authorization Certificate

FIG. 3 illustrates an exemplary embodiment of the authorization certificate 70 for delegating right to access the collaborative resources 31, 33 as presented in FIG. 2. In this embodiment, the authorization certificate 70 includes six data fields—an issuer 71, a holder 72, a re-delegation flag 73, a self-usage flag 79, an operation 74 and a valid period 75. The authorization certificate 70 enables an entity to re-delegate the authority to access the collaborative resources 31, 33. In addition, the authorization certificate 70 can restrict the entity from accessing the collaborative resources 31, 33.

The issuer 71 is an entity granting the authority to access the collaborative resources 31, 33 while the holder 72 is the entity receiving the authority. When the holder 72 re-delegates the authority, the holder 72 becomes the issuer 71 in a subsequent copy of the authorization certificate 70.

The re-delegation flag 73 registers whether the holder 72 has been given the right to re-delegate the authority to access the collaborative resources 31, 33. The issuer 71 may set the re-delegation flag 73 false to disable the holder 72 from re-delegating the authority. It will be noted that when an authorization certificate 70 contains a re-delegation flag 73 that is set to false, the subsequent entity is unable to re-delegate the authority.

The self-usage flag 79 provides restricted access to the collaborative resources 31, 33. When the self-usage flag 79 is set to true, the entity is not permitted to access the collaborative resources 31, 33. In the event when the self-usage flag 79 is set to false, the entity is able to re-delegate a set of access permission determines by the operation field 74. The operation field 74 contains a data field which represents the set of access permissions such as read file only, write file only, read and write file.

The valid period field 75 indicates the time period during which the authorization certificate 70 is valid. In other words, the authorization certificate 70 expires after a period of time and becomes unusable.

The authorization certificates 70, 76, 77 and 78 are illustrated with the example in FIG. 2. In the example of authorization certificate 76, the issuer 71 is client 60 who partly owns the collaborative resources 31. The collaborative resources 31 managed by client 60 include folders 36, 38 and documents 40, 42, 46. The holder 72 is client 62 whom the client 60 has given permission to re-delegate or access the collaborative resources 31. The self-usage flag 79 is set to true, and the client 62 is allowed to access the collaborative resources 31. In this example, the client 62 is given read-only access to folders 36, 38 and documents 40, 42. The document 46 is not present in the authorization certificate 76 and therefore, the document 46 is invisible to the client 62. The authorization certificate 76 is valid for a time period of "V1", after which the authorization certificate 76 expires automatically.

As the re-delegation flag is set to true in the authorization certificate 76, the client 62 is able to re-delegate to another entity the permission it holds for accessing the resources. This is further illustrated in the authorization certificate 77. The client 62, who is the holder 72 in the authorization certificate 76 becomes the issuer 71 in the authorization certificate 77. The holder 72 is client 64 whom the client 62 has re-delegated.

The self-usage flag 79 is set to false and consequently, client 64 is not permitted to access the collaborative resources 31. However, client 64 is has the permission to re-delegate to another entity the authority to access the collaborative resources 31. In particular, client 64 is able to re-delegate to another entity with the authority to perform the operation of reading folders 36, 38 and document 40.

As established above, the client 62 is able to restrict the authority of client 64 without the need to inform the owner, i.e., client 60.

In the next example, client 64 issues the authorization certificate 78 to client 66. However, the client 66 is not permitted to re-delegate to another entity the authority to access the collaborative resources as the re-delegation field is set to false. In addition, the client 66 is limited to performing read operations on folders 36 and 38. Accordingly, the client 66 is only aware that folder 36 is the parent of folder 38, which contains documents 40 and 42. The client 66 is unable to access the documents 40 and 42.

The authorization certificates 76, 77 and 78 illustrate a chain of authorization certificates created by authorized entities, clients 60, 62, 64. It will be noted that the issuer 71 and holder 72 of each of the authorization certificates, 76, 77 and 78, establish a sequence of the entities re-delegating the authority. For example, client 62, the holder 72 of the authorization certificate 76 becomes the issuer 71 of authorization certificate 77. Client 64 who is the holder 72 of authorization certificate 77 becomes the issuer 71 of authorization certificate 78. In one embodiment of the present invention, the sequence of issuer 71 and holder 72 identifies that a proper re-delegation channel has been established.

Delegation Protocol

Figure 4:
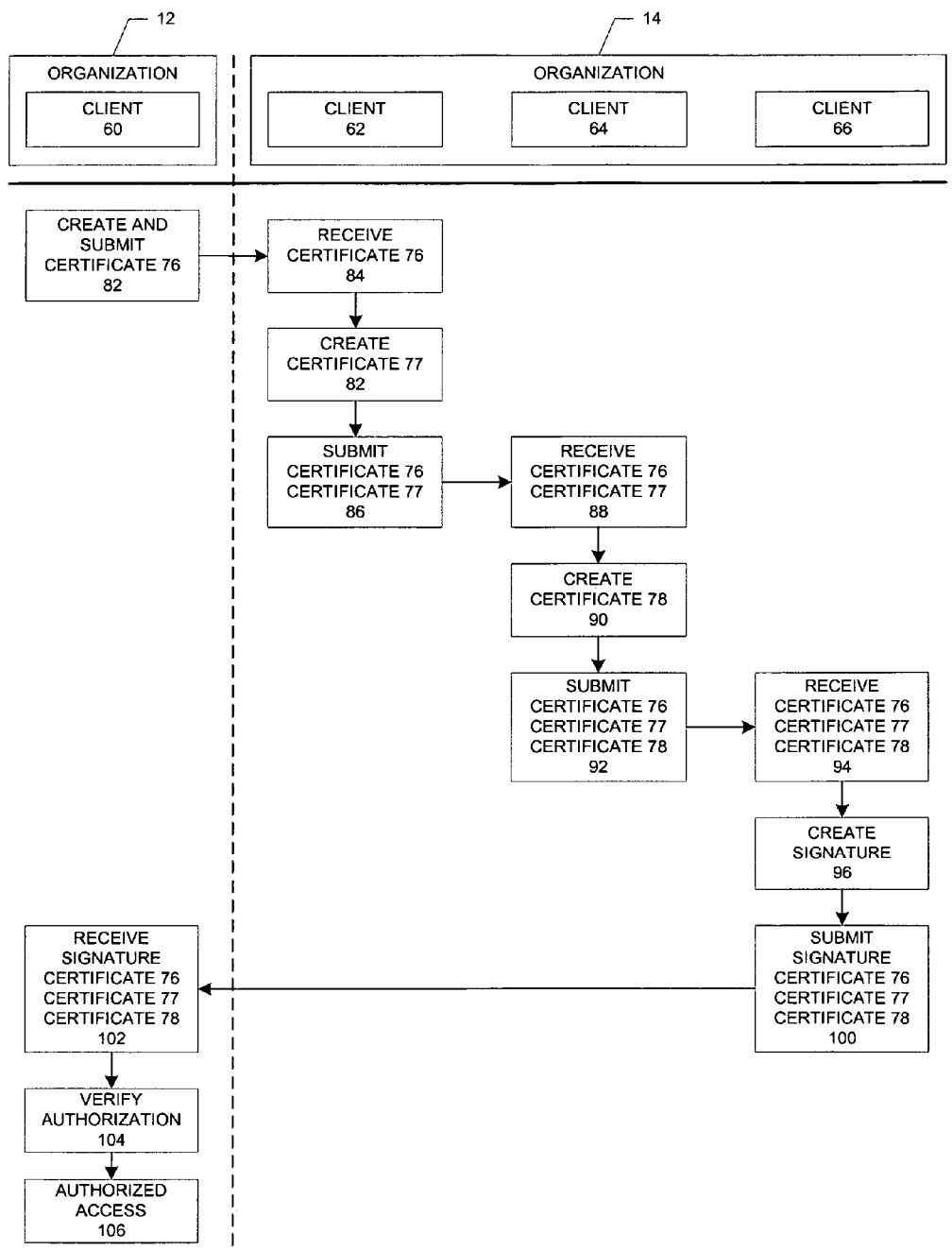
FIG. 4 is an interactive flow chart illustrating a method, according to one exemplary embodiment of the present invention, to delegate authority for accessing collaborative resources.

FIG. 4 is an interaction flow diagram illustrating a method, according to an exemplary embodiment of the present invention, to delegate authority using the authorization certificate 70 described in FIG. 3.

In one exemplary embodiment of the present invention, the delegation protocol consists of two phases—one for delegating authority to access the collaborative resources 31, 33 and another for requesting an access to the collaborative resources 31, 33.

Delegation Phase

Starting at block 82, the client 60 of the first organization 12 creates an authorization certificate 76 which is submitted to the client 62 of the second organization 14. In one embodiment, the authorization certificate 76 allows the client 62 to access the collaborative resources 31 managed by the client 60. In addition, the authorization certificate 76 permits the client 62 to re-delegate the authority to another entity.

The client 62 receives the authorization certificate 76 at block 84 and decides to re-delegate to client 64. The client 62 creates an authorization certificate 77 at block 82. As illustrated earlier in FIG. 3, the authorization certificate 77 contains the data (client 62, client 64, true, false, read(36,38,40), v3). As the re-delegation flag 73 is set to true, client 64 can in turn re-delegate to another entity. To complete the delegation phase, the client 62 submits to the client 64 the authorization certificates 76 he receives from client 60 and the authorization certificate 77 created by him.

The client 64 receives the authorization certificates 76 and 77 at block 88. The client 64 has been authorized to re-delegate the right to access the collaborative resources 31. The third client 64 creates an authorization certificate 78 at block 90 with client 66 as the holder. The certificates 76, 77 and 78 are then submitted to the fourth client 66 at block 92.

The protocol as described above consists of the delegation phase whereby the authority to access collaborative resources is propagated from the client 60, who manages the collaborative resources 31 in the digital resource server 32, to the client 66. The next phase of the protocol, which handles the requesting of the collaborative resources 31, is described below.

Requesting Phase

In one exemplary embodiment of the present invention, the requesting phase of the protocol provides a mechanism to verify the identity of the requestor and another mechanism to authenticate the authority that the requestor is delegated with.

In one embodiment, the present invention uses a PKI digital signature to confirm the identity of the requester. Basically, the requestor uses a private key to digitally sign a message. Unlike the handwritten signature, this digital signature is different every time it is made. A unique mathematical value (first hash value) determined by the content of the message is calculated using a "hashing" or "message authentication" algorithm, and then this value is encrypted with the private key, thereby, creating the digital signature for this specific message. The encrypted value is either attached to the end of the message or is sent as a separate file together with the message. The Public Key corresponding to this private key may also be sent with the message, either on its own or as part of a certificate. The receiver of the digitally signed message then uses the correct Public Key to verify the signature. The encrypted value is decrypted to obtain the first hash value. Next, using the hashing algorithm, the message is recalculated to obtain a second hash value. If the second hash value matches the first hash value, it can be concluded that the entity controlling the private key corresponding to the public key sent the information. In addition, the information has not been altered since it was signed.

At block 96, the client 66 creates a PKI encrypted signature. In one embodiment, the client 66 uses the operation field 74, "READ(36, 38)", from the authorization certificate 78 as the message to be encrypted. The encrypted signature is submitted to the first client 60 at block 100. In addition, a chain of authorization certificates, 76, 77, 78, are submitted.

At block 102, the client 60 receives the encrypted signature and the chain of authorization certificates, 76, 77, 78. These are further verified at block 105. The signature is decrypted to confirm the identity of the client 66. The process to verify the authority of the client 66 is further discussed in the section below.

If the verification process is successful, the client 66 is allowed to perform the necessary operation at block 106. In this example, the client 66 is permitted to perform read-only operations on folders 36 and 38.

Verification Process

Figure 5:
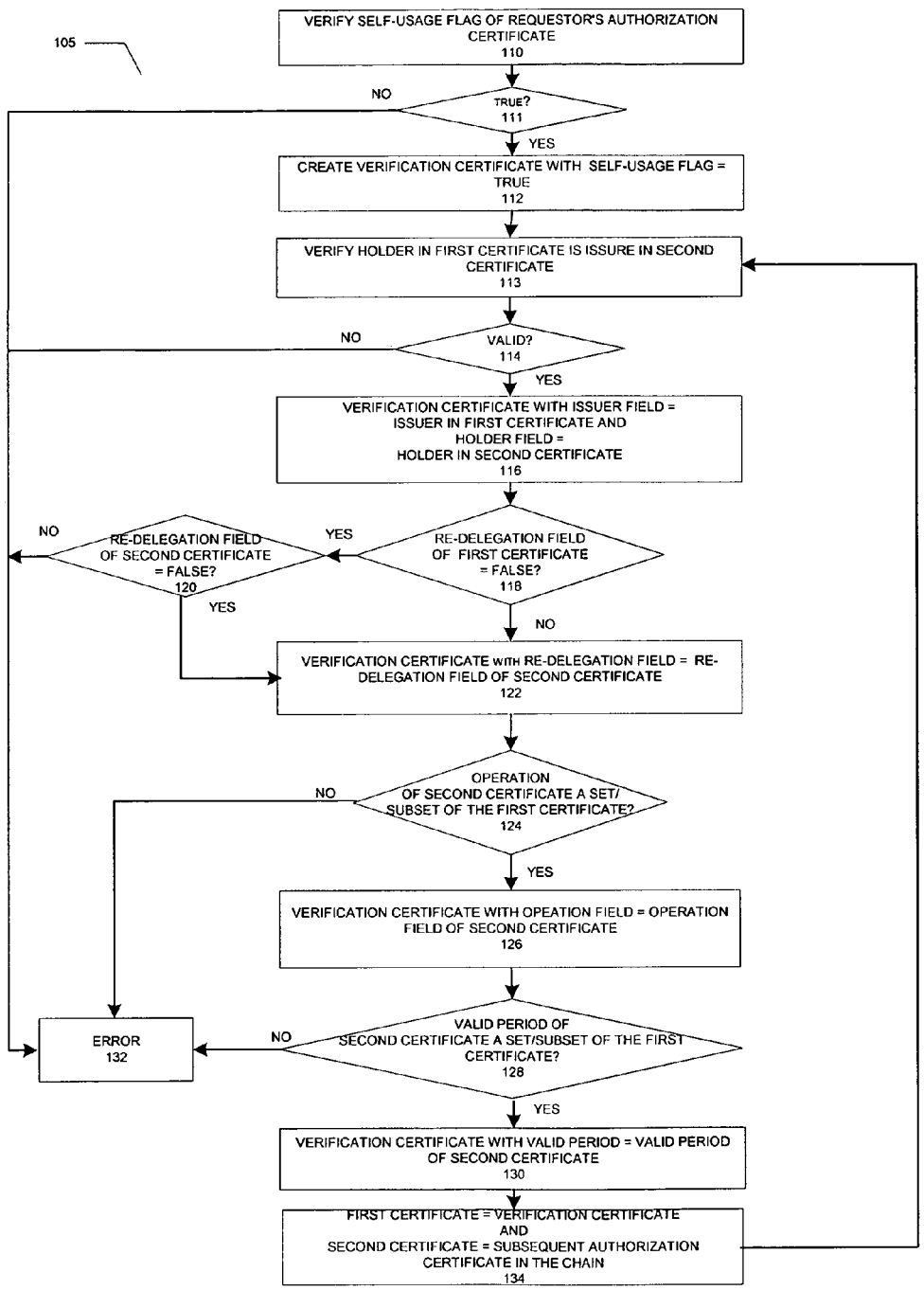
FIG. 5 is a flow chart illustrating one approach of establishing the delegation authority of a participant in accordance with an exemplary embodiment of the present invention.

FIG. 5 is a flowchart diagram illustrating the verification process 105 for authenticating the authority of the requester to access the collaboration resources 31, in accordance to one exemplary embodiment of the present invention. The verification process 105 includes deriving a verification certificate from a chain of authorization certificates. In one embodiment, the verification certificate contains the same data structure as the authorization certificate 70.

The verification process 105 starts at block 110 wherein the self-usage flag 79 of the last authorization certificate of the chain of authorization certificate is determined. If the self-usage flag 79 is set to false, the requester is not permitted to access the collaboration resources 313. Otherwise, a verification certificate is created at block 112 with the self-usage flag 79 set to true.

In the next phase, at block 113, a first certificate is compared with a second certificate to further derive the values for the verification certificate. The first and the second certificate being a first and a second authorization certificate of a chain of authorization certificates. In the subsequent process, the first certificate is the verification certificate created from the previous verification process 105 and the second certificate is a third authorization certificate.

At block 113, the first certificate is compared with the second certificate to establish a sequence of issuer-holder. For example, the holder 72 of the first authorization certificate is also the issuer 71 of the second authorization certificate. Any deviation from the issuer-holder sequence is an indication that the authority of the requester has been improperly delegated.

If the sequence of issuer-holder is correct, at the next block 116, the verification certificate is created with the issuer 71 and the holder 72 set to the issuer 71 of the first certificate and the holder 72 of the second authorization certificate respectively.

In the next block 118, the verification process 105 examines the re-delegation field of the first authorization certificate. It is noted that in a chain of authorization certificates 70, if the first authorization certificate does not have the re-delegation authority, the subsequent authorization certificate will not have such re-delegation authority. Therefore, if the re-delegation field of the first certificate is false, the re-delegation field of the second authorization certificate is further verified at block 120. In the case where the re-delegation field of the second authorization certificate is true, the second authorization certificate is invalid. Otherwise, the re-delegation field of the verification certificate is assigned the value of the re-delegation field of the second authorization certificate at block 122.

At block 124, the operation field 74 is verified. As established earlier, an entity cannot perform an operation beyond the scope of what the parent entity is entitled to. For example, if the parent entity is given read-only authority, the parent entity cannot assign a read-and-write or write-only authority to another entity. At block 124, the operation field 74 of the second certificate is examined to determine whether the operation field 74 is a set or subset of the first certificate. At the next block 126, the operation field of the verification certificate is assigned the value of the operation field of the second certificate.

The valid period 75 of the second certificate is verified at block 128. Similarly, an entity cannot be delegated with a valid period 75 exceeding the parent entity. At block 128, the valid period 75 of the second certificate is analyzed to determine whether the valid period 75 is a set or subset of the first certificate. In addition, the verification certification takes the valid period 75 of the second certificate at block 130.

The process 105 is repeated for the chain of authorization certificate with the verification certificate as the first certificate and the next authorization certificate as the second certificate at block 134.

FIG. 6 illustrates some exemplary verification certificates created based on the verification process 105 described in FIG. 5. The verification process 105 begins with authorization certificate 78 of the requestor, which is part of a chain of authorization certificates, 76, 77, 78. The self-usage flag 79 is verified. In this case, the self-usage flag 79 is set to true and therefore the requestor can request access to the collaborative resources.

Next, the authorization certificates 76, 77 are examined. The holder 72 of the authorization certificate 76 is determined whether the holder 72 matches the issuer 71 of the authorization certificate 77. In this example, client 62 is the holder 72 and the issuer 71 of the authorization certificates 76 and 77 respectively. Therefore, the verification certificate 140 has client 60 as the issuer 71 and client 64 as the holder 72.

The next phase verifies the re-delegation flag 73. In this example, the authorization certificate 77 contains a permission to re-delegate the authority to another entity. In order for the authorization certificate 77 to contain such a permission, the authorization certificate 76, which is the parent of the authorization certificate 77, must also contain the same permission. The authorization certificate 76 has re-delegation flag 73 set to true. Therefore, the authorization certificate 77 contains a valid re-delegation flag 73. The verification certificate 140 is then assigned the re-delegation flag 73 of the authorization certificate 73.

Next, the verification process 105 examines the authority to perform certain operations on the collaborative resources. The authorization certificate 77 contains the operation of READ(36, 38, 40) which is a subset of the authorization certificate 76, READ(36, 38, 40, 42). The authorization certificate 77 contains a valid operation and the verification certificate 140 is assigned with the operation 74 of the authorization certificate 77.

Similarly, the valid period 75 of the authorization certificates 76, 77 are compared. In this example, the authorization certificate 77 has a valid period 75 of (2003-2006) which is a subset of that of the authorization certificate 76, (2002-2006). Therefore, the valid period of authorization 77 is correct and the verification certificate 140 is assigned the valid period 75 of the authorization certificate 77.

The verification process 105 is repeated to compare the verification certificate 140 with the authorization certificate 78 to derive the authorization certificate 142. It will be noted that the issuer 71 of the verification certificate 140 captures the original entity, client 60, who first re-delegated the authority to other entities.

System Platform

Figure 7:
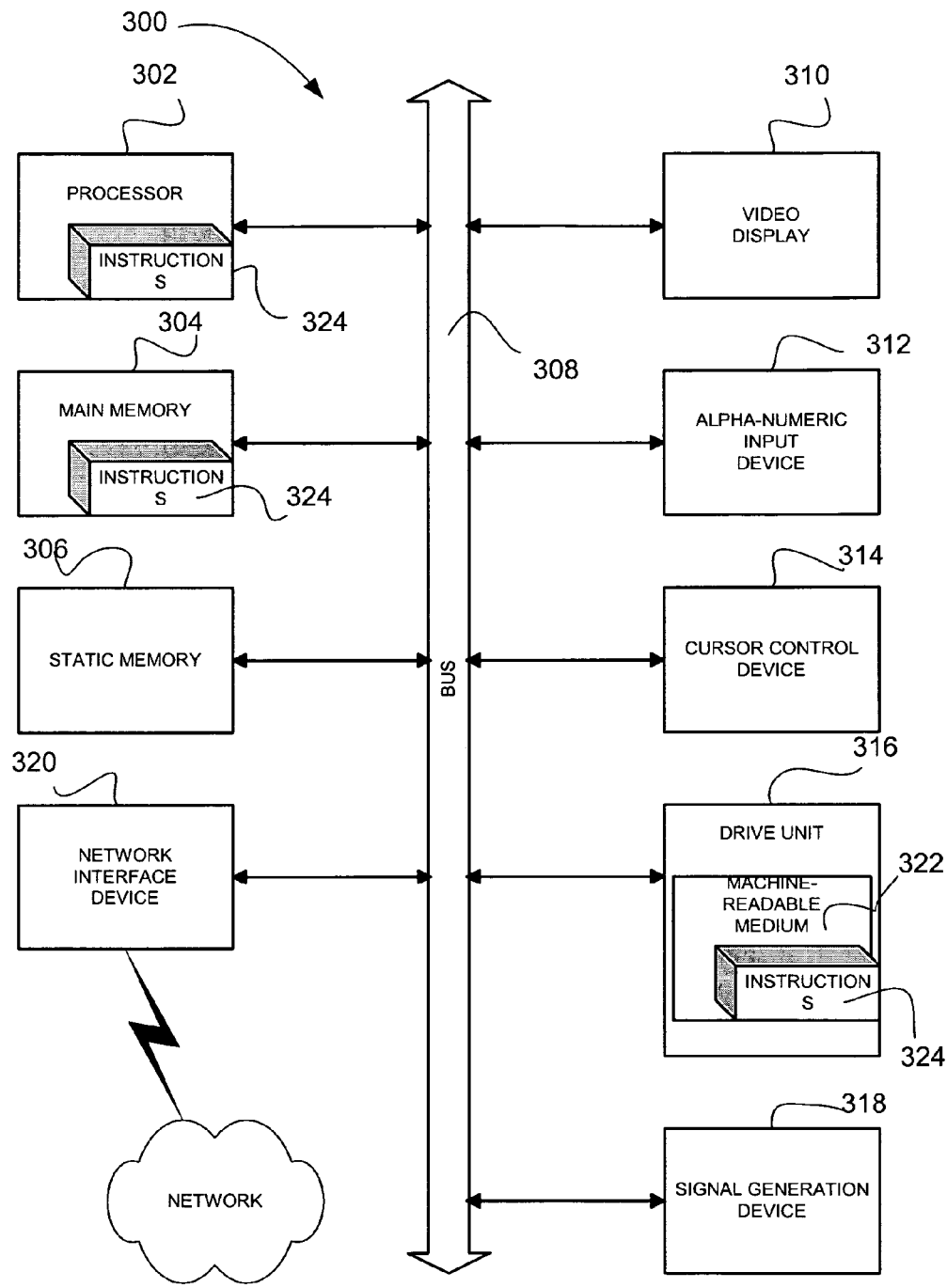
FIG. 7 is a diagrammatic representation of a machine within which a set of instructions, for causing the machine to perform any one of methods described herein, may be executed.

FIG. 7 shows a diagrammatic representation of a machine in the exemplary form of a computer system 702 within which a set of instructions for causing the machine to perform any one or more of the above methodologies may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 702 includes a processor 704 (e.g., a central processing unit (CPU) a graphics processing unit (GPU) or both), a main memory 706 and a static memory 708, which communicate with each other via a bus 728. The computer system 702 may further include a video display unit 712 (e.g., a liquid crystal display (LCD) or a cathode ray tube (CRT)). The computer system 702 also includes an alphanumeric input device 714 (e.g., a keyboard), a cursor control device 716 (e.g., a mouse), a disk drive unit 718, a signal generation device 720 (e.g., a speaker) and a network interface device 710

The disk drive unit 718 includes a machine-readable medium 724 on which is stored one or more sets of instructions (e.g., software 722) embodying any one or more of the methodologies or functions described herein. The software 722 may also reside, completely or at least partially, within the main memory 706 and/or within the processor 704 during execution thereof by the computer system 702, the main memory 706 and the processor 704 also constituting machine-readable media.

The software 722 may further be transmitted or received over a network 01 via the network interface device 710.

While the machine-readable medium 724 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, a method and system to delegate authority in an online collaborative environment has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for delegating an access authority for accessing protected resources, the method including:
building, at a first client, an original authorization certificate to control access to protected resources maintained by the first client;
issuing, by the first client, the original authorization certificate to a second client, the original authorization certificate delegating to the second client a level of authority to access the protected resources maintained by the first client and a level of authority to re-delegate the access authority to another client via a second authorization certificate created by the second client;
establishing, at each successive re-delegation, a chain of the authorization certificates conveying a level of access authority which is at most the level of access authority conveyed in the immediately preceding delegation, and a level of re-delegation authority which is at most the level of re-delegation authority conveyed in the immediately preceding delegation, each authorization certificate in the chain containing information indicating the level of access authority given to a particular client to access the protected resources and a re-delegation flag indicating the level of re-delegation authority given to the particular client, including whether the particular client has a right to re-delegate authority to another client;
receiving at the first client an access request for the protected resources from a requesting client other than the second client; and
verifying at the first client the access request for the protected resources based on the chain of the authorization certificates and on an encrypted signature from the requesting client,
wherein the original authorization certificate for establishing at each successive re-delegation the chain of the authorization certificates conveying a level of access authority includes a valid period and a re-delegation flag.

2. The method of claim 1, wherein building the original authorization certificate includes:
determining an issuer delegating the access authority;
determining a recipient receiving the access authority;
determining a self-usage authority that permits the recipient to access the protected resources;
determining a re-delegation authority via the re-delegation flag that permits the recipient to delegate the access authority to another participant;
determining a type of operation performed on the protected resources; and
determining the valid period for the original authorization certificate.

3. The method of claim 2, wherein the type of operation performed on the protected resources includes at least one of a read-and-write operation, a read-only operation and a write-only operation.

4. The method of claim 1, wherein establishing at each re-delegation the chain of the authorization certificates includes:
communicating the first authorization certificate between the first and the second clients, the first client delegating the access authority to the second client;
determining the re-delegation authority of the second client;
creating the second authorization certificate in response to permitting the re-delegation authority of the second client; and
communicating the first and the second authorization certificates between the second and a third clients, the second client delegating the access authority to the third client.

5. The method of claim 1, wherein verifying the access request for the protected resources includes:
authenticating the requesting client;
receiving the chain of the authorization certificate from the requesting client; and
verifying the chain of the authorization certificates.

6. The method of claim 5, wherein authenticating the requesting client includes decrypting the encrypted signature containing a type of operation performed on the protected resources, wherein the type of operation performed on the protected resources includes at least one of a read-and-write operation, a read-only operation and a write-only operation.

7. The method of claim 5, further including verifying the self-usage authority of the authorization certificate of the requesting client.

8. The method of claim 5, wherein verifying the chain of the authorization certificates includes comparing the first and the second authorization certificates of the chain of the authorization certificates.

9. The method of claim 8, wherein comparing the first and the second authorization certificates further includes:
determining a sequence of issuer-recipient from the first and the second authorization certificates;
determining the re-delegation authority of the second authorization certificate is not permitted when the first authorization certificate is not permitted;
determining the type of operation performed of the second authorization certificate is a set or a subset of the first authorization certificate; and
determining a valid period of the second authorization certificate is a set or a subset of a valid period of the first authorization certificate.

10. The method of claim 9, wherein determining the sequence of issuer-recipient includes determining whether a recipient of the first authorization certificate is an issuer of the second authorization certificate.

11. The method of claim 10, further including creating a verification certificate from the first and the second authorization certificates.

12. The method of claim 11, further including assigning to the recipient the verification certificate, the re-delegation authority, and the valid period of the second authorization certificate and the issuer of the first authorization certificate.

13. The method of claim 11, wherein the first and the second certificates being the verification certificate and a third authorization certificate of the chain of the authorization certificates.

14. A network system for delegating an access authority for accessing protected resources, the system including:
means for building, at a first client, an original authorization certificate to control access to protected resources maintained by the first client;
means for issuing, by the first client, the original authorization certificate to a second client, the original authorization certificate delegating to the second client a level of authority to access the protected resources maintained by the first client and a level of authority to re-delegate the access authority to another client via a second authorization certificate created by the second client;
means for establishing, at each successive re-delegation, a chain of the authorization certificates conveying a level of access authority which is at most the level of access authority conveyed in the immediately preceding delegation, and a level of re-delegation authority which is at most the level of re-delegation authority conveyed in the immediately preceding delegation, each authorization certificate in the chain containing information indicating the level of access authority given to a particular client to access the protected resources and a re-delegation flag indicating the level of re-delegation authority given to the particular client, including whether the particular client has a right to re-delegate authority to another client;
means for receiving at the first client an access request for the protected resources from a requesting client other than the second client; and
means for verifying at the first client the access request for the protected resources based on the chain of the authorization certificates and on an encrypted signature from the requesting client
wherein the original authorization certificate for establishing at each successive re-delegation the chain of the authorization certificates conveying a level of access authority includes: a valid period and a re-delegation flag.

15. The system of claim 14, wherein means for building the original authorization certificate includes:
means for determining an issuer delegating the access authority;
means for determining a recipient receiving the access authority;
means for determining a self-usage authority that permits the recipient to access the protected resources;
means for determining a re-delegation authority via the re-delegation flag that permits the recipient to delegate the access authority to another participant;
means for determining a type of operation performed on the protected resources; and
means for determining the valid period for the original authorization certificate.

16. The system of claim 15, wherein the type of operation performed on the protected resources includes at least one of a read-and-write operation, a read-only operation and a write-only operation.

17. The system of claim 14, wherein means for establishing at each re-delegation the chain of the authorization certificates includes:
means for communicating the first authorization certificate between the first and the second clients, the first client delegating the access authority to the second client;
means for determining the re-delegation authority of the second client;
means for creating the second authorization certificate in response to permitting the re-delegation authority of the second client; and
means for communicating the first and the second authorization certificates between the second and a third clients, the second client delegating the access authority to the third client.

18. The system of claim 14, wherein means for verifying the access request for the protected resources includes:
means for authenticating the requesting;
means for receiving the chain of the authorization certificates from the requesting client; and
means for verifying the chain of the authorization certificates.

19. The system of claim 18, wherein means for authenticating the requesting client includes means for decrypting the encrypted signature containing a type of operation performed on the protected resources, wherein the type of operation performed on the protected resources includes at least one of a read-and-write operation, a read-only operation and a write-only operation.

20. The system of claim 18, further including means for verifying the self-usage authority of the authorization certificate of the requesting client.

21. The system of claim 18, wherein means for verifying the chain of the authorization certificates includes means for comparing the first and the second authorization certificates of the chain of the authorization certificates.

22. The system of claim 21, wherein means for comparing the first and the second authorization certificates further includes:

means for determining a sequence of issuer-recipient from the first and the second authorization certificates;

means for determining the re-delegation authority of the second authorization certificate is not permitted when the first authorization certificate is not permitted;

means for determining the type of operation performed of the second authorization certificate is a set or a subset of the first authorization certificate; and means for determining a valid period of the second authorization certificate is a set or a subset of a valid period of the first authorization certificate.

23. The system of claim 22, wherein means for determining the sequence of issuer-recipient includes means for determining whether a recipient of the first authorization certificate is an issuer of the second authorization certificate.

24. The system of claim 23, further including means for creating a verification certificate from the first and the second authorization certificates.

25. The system of claim 24, further including means for assigning to the recipient the verification certificate, the re-delegation authority, and the valid period of the second authorization certificate and the issuer of the authorization first certificate.

26. The system of claim 24, wherein the first and the second authorization certificates being the verification certificate and a third authorization certificate of the chain of the authorization certificates.

27. A non-transitory machine-readable storage medium comprising instructions, which when executed by a machine, cause the machine to perform a method to delegate an access authority for accessing protected resources, the method including:

building, at a first client, an original authorization certificate to control access to protected resources maintained by the first client;

issuing, by the first client, the original authorization certificate to a second client, the original authorization certificate delegating to the second client a level of authority to access the protected resources maintained by the first client and a level of authority to re-delegate the access authority to another client via a second authorization certificate created by the second client;

establishing, at each successive re-delegation, a chain of the authorization certificates conveying a level of access authority which is at most the level of access authority conveyed in the immediately preceding delegation, and a level of re-delegation authority which is at most the level of re-delegation authority conveyed in the immediately preceding delegation, each authorization certificate in the chain containing information indicating the level of access authority given to a particular client to access the protected resources and a re-delegation flag indicating the level of re-delegation authority given to the particular client, including whether the particular client has a right to re-delegate authority to another client;

receiving at the first client an access request for the protected resources from a requesting client other than the second client; and verifying at the first client the access request for the protected resources based on the chain of the authorization certificates and on an encrypted signature from the requesting client, wherein the original authorization certificate for establishing at each successive re-delegation the chain of the authorization certificates conveying a level of access authority includes: a valid period and a re-delegation flag.

28. The non-transitory machine-readable storage medium of claim 27, wherein building the original authorization certificate includes:

determining an issuer delegating the access authority;

determining a recipient receiving the access authority;

determining a self-usage authority that permits the recipient to access the protected resources;

determining a re-delegation authority via the re-delegation flag that permits the recipient to delegate the access authority to another participant;

determining a type of operation performed on the protected resources; and determining valid period for the original authorization certificate.

29. The non-transitory machine-readable storage medium of claim 28, wherein the type of operation performed on the protected resources includes at least one of a read-and-write operation, a read-only operation and a write-only operation.

30. The non-transitory machine-readable storage medium of claim 28, wherein establishing at each re-delegation the chain of the authorization certificates includes:

communicating the first authorization certificate between the first and the second clients, the first client delegating the access authority to the second client;

determining the re-delegation authority of the second client;

creating a second authorization certificate in response to permitting the re-delegation authority of the second client; and communicating the first and the second authorization certificates between the second and a third clients, the second client delegating the access authority to the third client.

31. The non-transitory machine-readable storage medium of claim 27, wherein verifying the access request for the protected resources includes:

authenticating the requesting client;

receiving the chain of the authorization certificates from the requesting client; and verifying the chain of the authorization certificates.

32. The non-transitory machine-readable storage medium of claim 31, wherein authenticating the requesting client includes decrypting the encrypted signature containing a type of operation performed on the protected resources, wherein the type of operation performed on the protected resources includes at least one of a read-and-write operation, a read-only operation and a write-only operation.

33. The non-transitory machine-readable storage medium of claim 31, further including verifying the self-usage authority of the authorization certificate of the recipient.

34. The non-transitory machine-readable storage medium of claim 31, wherein verifying the chain of the authorization certificate includes comparing the first and the second authorization certificates of the chain of the authorization certificates.

35. The non-transitory machine-readable storage medium of claim 34, wherein comparing the first and the second certificates further includes:

determining a sequence of issuer-recipient from the first and the second authorization certificates;

determining the re-delegation authority of the second authorization certificate is not permitted when the first authorization certificate is not permitted;

determining the type of operation performed of the second authorization certificate is a set or a subset of the first authorization certificate; and determining a valid period of the second authorization certificate is a set or a subset of a valid period of the first authorization certificate.

36. The non-transitory machine-readable storage medium of claim 35, wherein determining the sequence of issuer-recipient includes determining whether a recipient of the first authorization certificate is an issuer of the second authorization certificate.

37. The non-transitory machine-readable storage medium of claim 36, further including creating a verification certificate from the first and the second authorization certificates.

38. The non-transitory machine-readable storage medium of claim 37, further including assigning to the recipient the verification certificate, the re-delegation authority, and the valid period of the second authorization certificate and the issuer of the first authorization certificate.

39. The non-transitory machine-readable storage medium of claim 37, wherein the first and the second authorization certificates being the verification certificate and a third authorization certificate of the chain of the authorization certificates.

40. The method of claim 2 further comprising:
determining a valid period for the second authorization certificate; and
delegating the valid period for the original authorization certificate to the second client when the determined valid period for the second authorization certificate is less than or equal to the valid period for the original authorization certificate.

41. The method of claim 1, wherein the original authorization certificate for establishing at each successive re-delegation the chain of the authorization certificates conveying a level of access authority includes: an issuer, a holder, a self-usage flag, an operation.

42. The method of claim 41, wherein the self-usage flag indicates whether the first or second client is permitted to access the protected resources and whether the first or second client is able to re-delegate a set of access permissions.

43. The method of claim 1, wherein the second client is operable to restrict authority of another client independent of informing the first client where the original authorization certificate was built.

44. The method of claim 1, wherein verifying at the first client the access request for the protected resources is based on the chain of the authorization certificates and on an encrypted signature from the requesting client only.

* * * * *